United States Patent
Hoover et al.

(10) Patent No.: US 11,498,685 B2
(45) Date of Patent: Nov. 15, 2022

(54) AIRCRAFT ARMREST WITH LOCKING ADJUSTABLE ARM PAD

(71) Applicant: AMI Industries, Inc., Colorado Springs, CO (US)

(72) Inventors: Douglas E. Hoover, Colorado Springs, CO (US); Keith M. Ferguson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/186,128

(22) Filed: Feb. 26, 2021

(65) Prior Publication Data

US 2021/0269162 A1    Sep. 2, 2021

Related U.S. Application Data

(60) Provisional application No. 62/982,549, filed on Feb. 27, 2020.

(51) Int. Cl.
*B64D 11/06* (2006.01)

(52) U.S. Cl.
CPC ...... *B64D 11/0644* (2014.12); *B64D 11/0689* (2013.01)

(58) Field of Classification Search
CPC ..................... B64D 11/0644; B64D 11/0689
See application file for complete search history.

(56) References Cited

U.S. PATENT DOCUMENTS

2019/0092195 A1    3/2019    Davis et al.

FOREIGN PATENT DOCUMENTS

| CN | 101386282 A | * | 3/2009 | ............... B60R 7/04 |
|----|----|----|----|----|
| DE | 102005006977 A1 | | 8/2006 | |
| DE | 102010054753 A1 | | 6/2012 | |
| KR | 2002045064 A | * | 6/2002 | ............... B60R 7/04 |

OTHER PUBLICATIONS

Extended Search Report for European Application No. 21160077.0 dated Jul. 13, 2021, 7 pages.

* cited by examiner

*Primary Examiner* — Anthony D Barfield
(74) *Attorney, Agent, or Firm* — Suiter Swantz pc llo

(57) ABSTRACT

An armrest is disclosed that includes an armrest subframe configured to couple to an arm of the seat that includes a slot within a face of the armrest subframe configured to receive a stop pin. The armrest further includes an arm pad translatably coupled to the armrest subframe and includes a plurality of grooves formed on one edge of the armrest subframe. The arm pad further includes the stop pin that restricts the translation of the arm pad and a spring anchor. The armrest further includes a lever rotationally coupled to the armrest that includes a locking pin configured to engage one or more grooves of the plurality of grooves, and an actuating end, wherein a movement of the actuating end at least one of engages or disengages the locking pin from the one or more grooves of the plurality of grooves. The armrest further includes a biasing spring.

13 Claims, 5 Drawing Sheets

AIRCRAFT ARMREST WITH LOCKING ADJUSTABLE ARM PAD

PRIORITY

The present application claims the benefit under 35 U.S.C. § 119(e) of U.S. Provisional App. No. 62/982,549 (filed Feb. 27, 2020), which is incorporated herein by reference.

BACKGROUND

A side-stick, or sidestick controller, is an aircraft control joystick located on a side console in a cockpit that is typically configured to control one or more aspects of the control of the aircraft. Pilot seats often have armrest adjustment capability to allow the pilot to comfortably and accurately make adjustments to the side-stick. It is often difficult to adjust the movements on the existing pilot seat side-stick armrests. Adjustment of existing pilot seat side-stick armrests usually requires spinning knobs multiple times to achieve the proper armrest orientation necessary for the pilot to have their arm positioned correctly to the aircraft side-stick mounted to the cock-pit console. The adjustment process is complicated enough for some side-stick armrests to have dial indicators to help the pilot achieve their optimum arm to side-stick position. Therefore, it would be advantageous to provide a solution that cures the shortcomings described above.

SUMMARY

An armrest is disclosed. In one or more embodiments, the armrest includes an armrest subframe configured to couple to a seat or an arm of the seat. In one or more embodiments, the armrest further includes a coupler configured to attach the armrest subframe to the seat or arm of the seat. In one or more embodiments, the armrest subframe further includes a slot within a face of the armrest subframe configured to receive a stop pin. In one or more embodiments of the disclosure, the armrest includes an arm pad operatively coupled to the armrest subframe and configured to slide alongside the armrest subframe. In one or more embodiments of the disclosure, the arm pad further includes a plurality of grooves formed on one edge of the armrest subframe. In one or more embodiments of the disclosure, the arm pad further includes the stop pin, wherein the stop pin restricts the translation of the arm pad along the armrest subframe. In one or more embodiments, the arm pad includes a spring anchor. In one or more embodiments, the armrest includes a lever. In one or more embodiments, the lever further includes a fulcrum rotationally coupled to at least one of the armrest subframe, the seat, or the arm of the seat. In one or more embodiments, the lever further includes a lock end comprising a locking pin configured to engage one or more grooves of the plurality of grooves. In one or more embodiments, the lever further includes an actuating end, wherein a movement of the actuating end at least one of engages or disengages the lock end from the one or more grooves of the plurality of grooves. In one or more embodiments, the armrest further includes a spring coupled to the spring anchor and the lever configured to bias the locking pin against the one or more grooves.

In some embodiments of the armrest, wherein the spring is further configured to bias the arm pad to translate relative to the armrest subframe.

In some embodiments of the armrest, wherein the spring is configured as an extension spring.

In some embodiments of the armrest, the coupler includes at least one bolt.

In some embodiments of the armrest, the arm pad includes at least five grooves.

In some embodiments of the armrest, the arm pad includes at least 10 grooves.

In some embodiments of the disclosure, the seat is a pilot seat for an aircraft.

A method to translate an arm pad relative to an armrest subframe is also disclosed. In one or more embodiments, the method includes pressing an actuating end of a lever operatively coupled to at least one of the armrest subframe, a seat, or an arm of the seat, wherein a pressing of the actuating end of the lever disengages a lock end of the lever from a first groove of a plurality of grooves formed on one edge of the arm pad via a fulcrum operatively associated with the lever. In some embodiments of the methods, the method includes translating the arm pad relative to the armrest subframe. In some embodiments of the disclosure, the method includes releasing the actuating end of the lever, wherein releasing the actuating end of the lever engages a lock end of the lever with a second groove of the plurality of grooves, wherein the lock end of the lever is biased against the second groove via a spring coupled to the lever and a spring anchor disposed on the arm pad.

In some embodiments of the method, the spring is further configured to bias the arm pad to translate relative to the armrest subframe.

In some embodiments of the method, the armrest subframe is coupled to the seat of arm of the seat via a coupler.

In some embodiments of the method, the spring is configured as an extension spring.

In some embodiments of the method, the coupler includes at least one bolt.

In some embodiments of the method, the arm pad includes at least five grooves.

In some embodiments of the method, the arm pad includes at least 10 grooves.

In some embodiments of the method, the seat is configured as a pilot seat for an aircraft.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
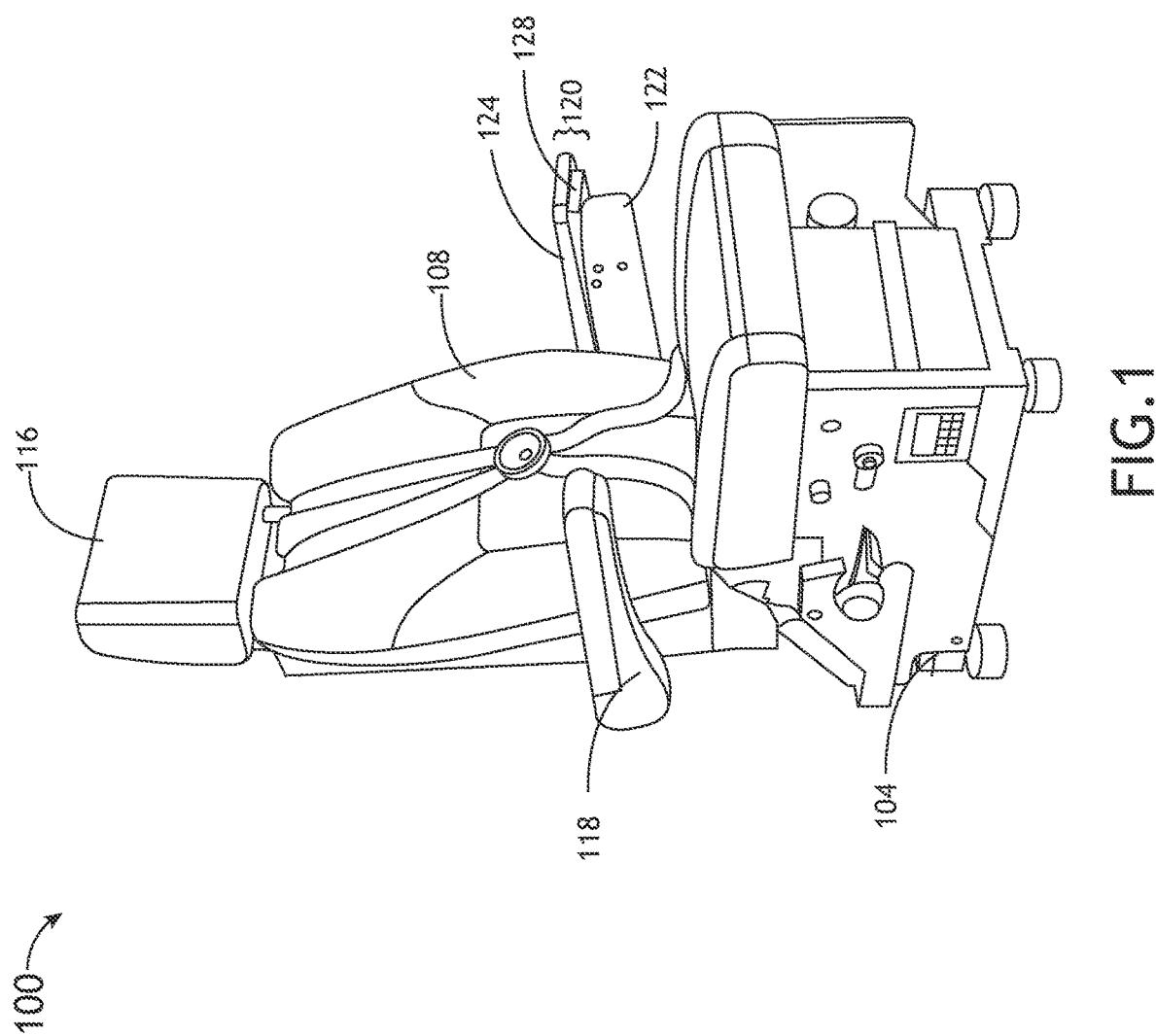
FIG. 1 is an example environment of an aircraft seat, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An armrest for a seat is disclosed. Specifically, an extendable armrest for a pilot seat in a cockpit is disclosed. In some implementations. the armrest can be extended to multiple locking positions by pressing an actuating lever that is spring biased, releasing a locking end of the lever from one or more groves formed into an edge of an arm pad, allowing the arm pad to be extended relative to an armrest subframe. Once the actuating lever is released, the locking end of the lever is biased via a spring against another groove on the arm pad, locking the arm pad into an extended position. Retraction of the arm pad similarly involves the pressing of the actuating lever, translation of the arm pad, and release of the actuating lever.

FIG. 1 is an example environment of a seat 100, in accordance with one or more embodiments of the present disclosure. In some embodiments, the seat is configured as a pilot seat. For example, the seat may be configured as a pilot seat disposed within the cockpit of an aircraft. The seat 100 includes a seat frame 104, a seat back 108, a seat pan 112, a headrest 116, and one or two arms 118.

In some embodiments, the seat includes an armrest 120 configured to support the arm of a pilot. The armrest 120 may be attached directly to the seat 100 (e.g., the armrest 120 configured as both the arm 118 as well as the armrest 120), may be attached to an existing arm 118 of the seat 100, or may be attached to an arm structure 122 that is compatible for attachment of the armrest 120. The armrest 120 is configured to extend an arm pad 124 relative to an armrest subframe 128.

Figure 2:
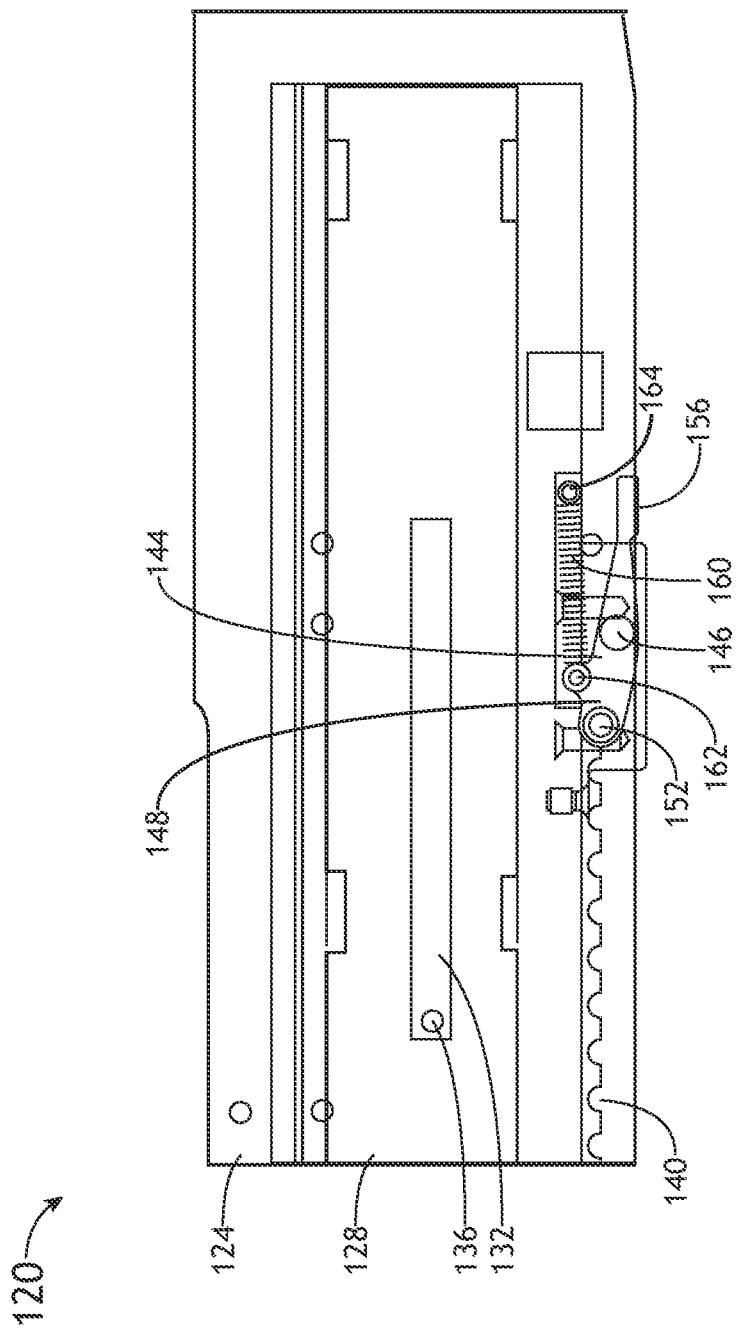
FIG. 2 is an illustration of a bottom view of the armrest in a locked position, in accordance with one or more embodiments of the disclosure.

FIG. 2 is an illustration of a reverse plan view (e.g., view from the floor) of the armrest 120 in a locked and retracted position, in accordance with one or more embodiments of the disclosure. The armrest subframe 128 is coupled directly or indirectly to the armrest 120 or the seat 100 via a coupler (not shown). The coupler may be configured as any type of coupling mechanism including but not limited to a nut and bolt coupling, a screw coupling, or a friction coupling.

In some embodiments, the arm pad 124 is translatably coupled to the armrest subframe 128. For example, the arm pad 124 may be configured to slide along the length of the armrest subframe 128 within a grooved channel or surface (e.g., the arm pad 124 and armrest subframe 128 may be arranged in a rail and groove arrangement). The arm pad 124 and/or armrest subframe 128 may also include one or more bearings to facilitate the sliding of the arm pad 124 along the armrest subframe 128.

In some embodiments, the armrest subframe 128 includes a slot 132 (e.g., aperture) within a face of the armrest subframe (e.g., the slot is an aperture in the armrest subframe). The slot 132 is used in conjunction with a stop pin 136 attached to the arm pad 124 of the armrest 120 (the slot 132 is configured to receive the stop pin 136). The slot 132 and stop pin 136 arrangement prevents the arm pad 124 from extending or retracting too far relative to the armrest subframe 128 and releasing from the armrest subframe 128. The stop pin 136 is inserted into the slot 132, restricting the translation of the arm pad 124 along the armrest subframe 128 (e.g., the stop pin 136 prevents the arm pad 124 from sliding off of the armrest subframe 128).

In some embodiments, the arm pad 124 includes a plurality of grooves 140 (e.g., half-circles) formed on one edge of the arm pad 124. The plurality of grooves 140 act as lock out positions for the armrest 120, allowing one or more positions where the arm pad 124 may be locked in place after translation along the armrest subframe 128. By way of example, one or more grooves of the plurality of grooves 140 along the one edge of the arm pad 124 may be spaced every 0.5 inches. The arm pad 124 may be configured with any number of grooves. For example, the arm pad 124 may be configured with five or more grooves. In another example, the arm pad may be configured with 10 or more grooves.

In some embodiments, the arm pad includes a lever 144. The lever is configured to lock and/or unlock the arm pad 120 relative to the position of the armrest subframe 128. In some embodiments, the lever 144 includes a fulcrum 146 rotationally coupled to the armrest subframe 128 or a component of the seat 100 (e.g., the arm 18 or arm structure 122). In some embodiments, the lever 144 further includes a lock end 148 that includes a locking pin 152. The locking pin 152 may be configured to engage a groove of the plurality of grooves 140 (e.g., a first groove) formed on the arm pad 124, preventing translation of the arm pad 124 relative to the armrest subframe 128.

In some embodiments, the lever 144 further includes an actuating end 156. Movement of the actuating end 156 engages and/or disengages the locking pin 152. For example, referring to FIGS. 2 and 3, when the actuating end 156 is pressed, the locking pin 152 is released from a groove of the plurality of grooves 140 (e.g., the first groove) freeing the arm pad 124 to so that it may translate relative to the armrest subframe 128.

In some embodiments the armrest 120 includes a spring 160 attached on one end to the lever 144 and the other end to the arm pad 124. For example, the spring may be attached to an attachment point 162 approximate to the lock end 148, with the other end of the spring 160 attached to a spring anchor 164 coupled to the arm pad 124. The spring is configured in combination of the lever 144 to bias the locking pin towards a groove 140 (e.g., a first groove), locking the arm pad 124 relative to the armrest subframe 128. The spring 160 may be configured as any type of spring including but not limited to an extension spring, a compression spring, a torsion spring, or a constant force spring. For example, the spring 160 may be configured as a crossover center extension spring.

Figure 3:
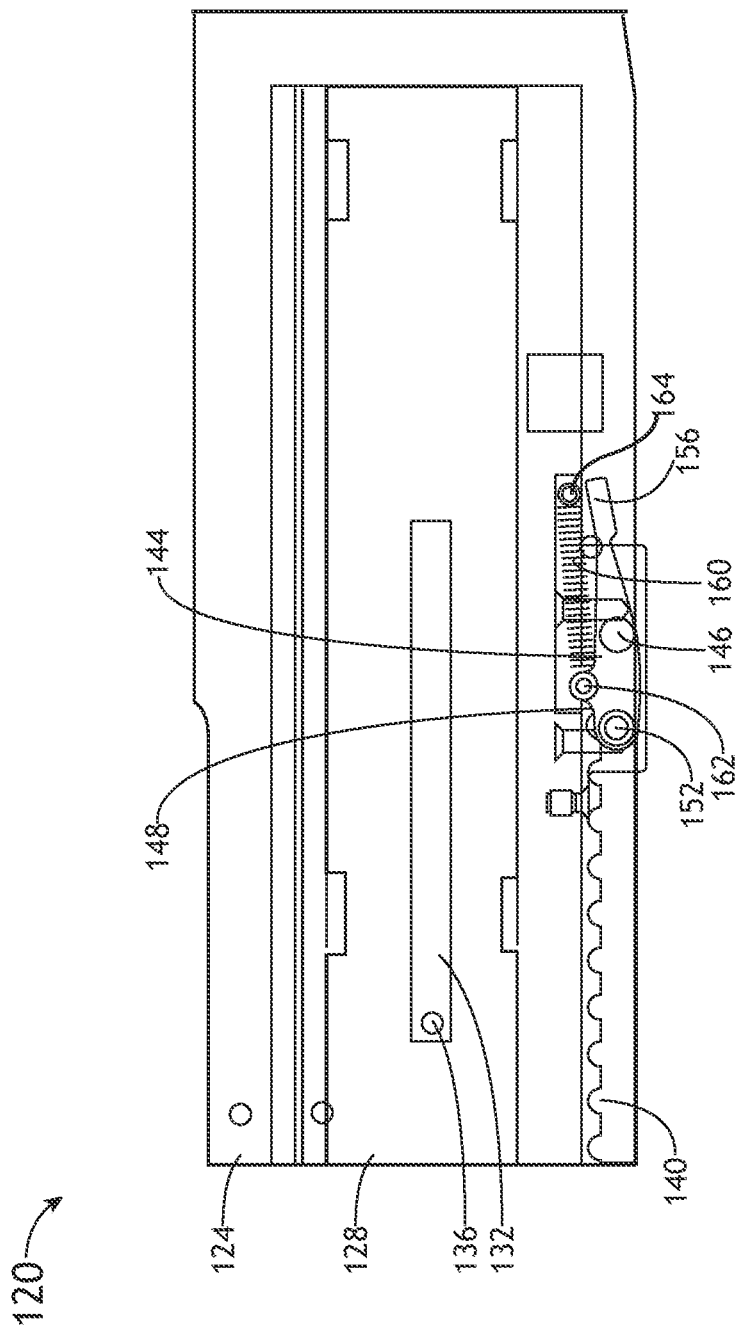
FIG. 3 is an illustration of a bottom view of the armrest 1 in an unlocked position, in accordance with one or more embodiments of the disclosure.

FIG. 3 is an illustration of a reverse plan view (e.g., view from the floor) of the armrest 120 in an unlocked position, in accordance with one or more embodiments of the disclosure. As described above, pressing the actuating end 156 (e.g., by applying manual pressure, which counteracts the biasing by the spring 160) disengages the locking pin 152 from the groove 140, resulting in an unlocked configuration. The arm pad 124 may then be translated relative to the armrest subframe 128 by manually sliding the arm pad 124 along the armrest subframe 128 (e.g., until the sliding is restricted by the stop pin 136.

Figure 4:
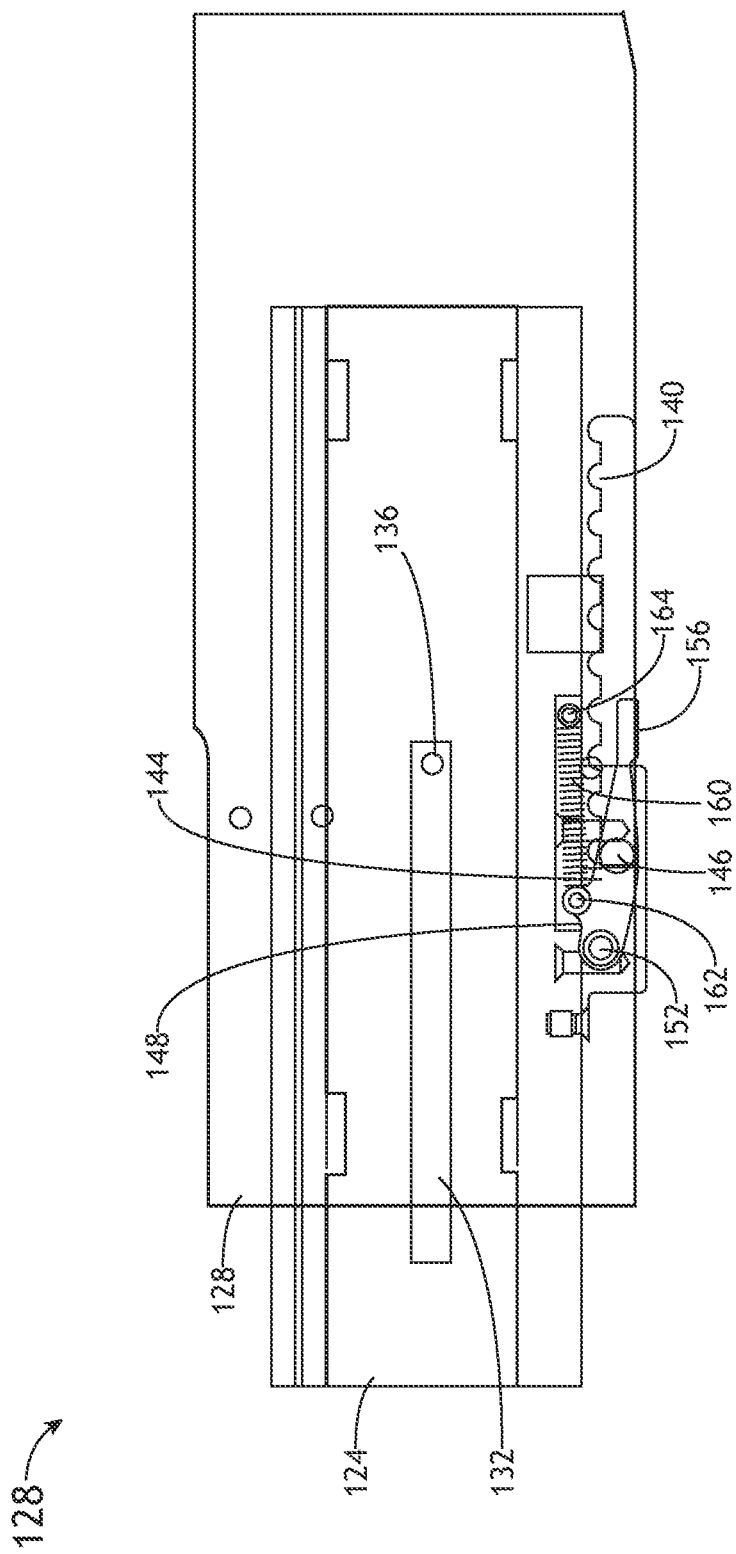
FIG. 4 is an illustration of a bottom view of the armrest in an extended and locked position, in accordance with one or more embodiments of the disclosure.

FIG. 4 is an illustration of a bottom view of the armrest 120 in an extended and locked position, in accordance with one or more embodiments of the disclosure. As mentioned herein, the translation of the arm pad 124 relative to the armrest subframe 128 (e.g., from a retracted to an extended position) can be accomplished by manually sliding the arm pad 124 relative to the armrest subframe 128 while the locking pin is disengaged (e.g., the actuating end 156 is depressed). After extension of the arm pad 124 to the desired length, the actuating end 156 is released (e.g., the actuating end is no longer pressed upon), the spring 160 biases the locking pin 152 into a second groove of the plurality of grooves 140, locking the arm pad 124 into place.

As described herein, the engagement of the lock end 148 of the lever 144 is enhanced by the extension of the spring 160 (e.g., the spring 160 biases the locking pin 152 into a first groove of the plurality of grooves). In some embodiments, the actuating end 156 must be depressed at the same time that the arm pad 124 is translated in order to manually slide the arm pad 124. In some embodiments, the force promoting the engagement of the locking pin 152 to the groove may come from a spring in a different configuration. For example, the fulcrum 146 of the lever 144 may itself have a spring mechanism that forces the locking pin 152 into the groove. Therefore, the above description should not be interpreted as a limitation of the present disclosure, but merely an illustration.

The force of the spring 160 may also bias the arm pad 124 into a retracted or home position. For example, if the arm pad 124 is locked into an extended position relative to the armrest subframe, the spring 160 (e.g., an extension spring) is also extended. By pressing the actuating end 156 and disengages the locking pin 152, the spring may contract, providing the motive force that translates the arm pad 124 into a retracted, home, or near-home position.

Figure 5:
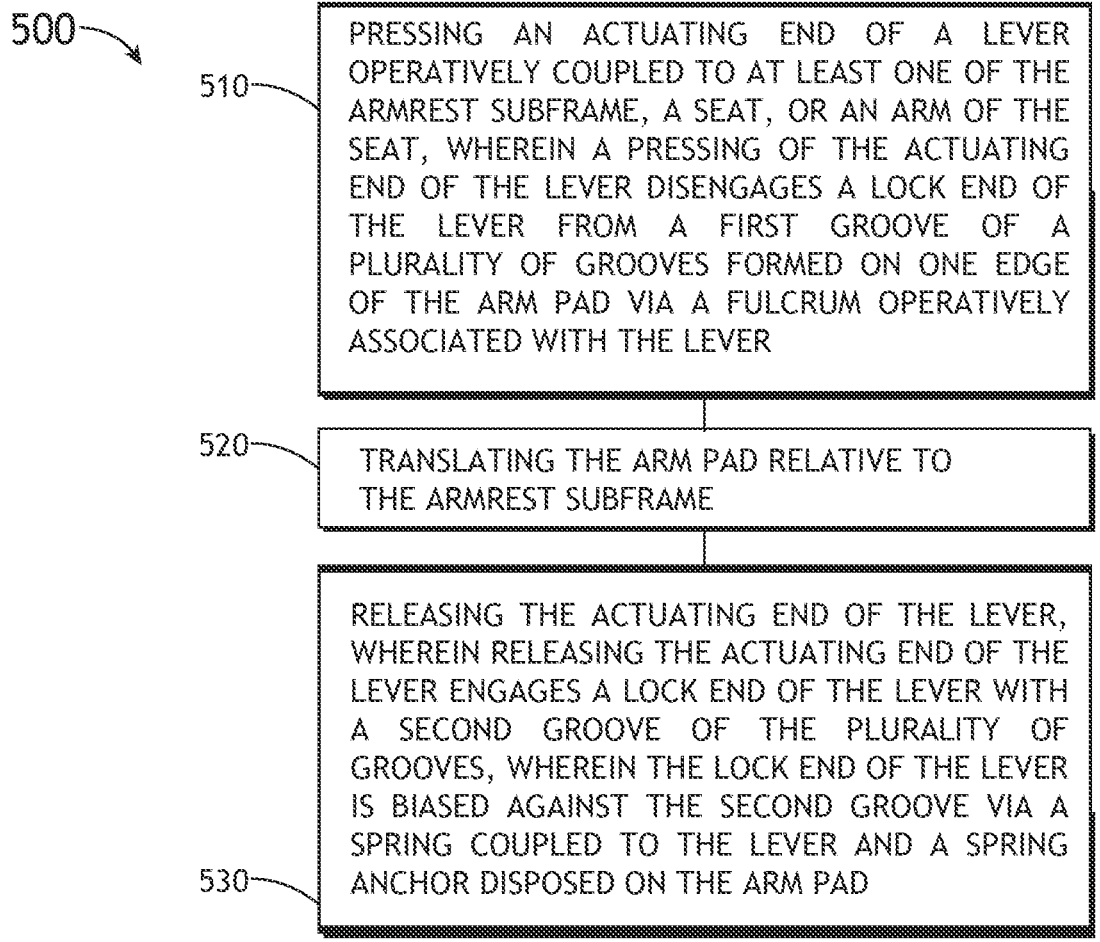
FIG. 5 is a flowchart illustrating a method for translating the arm pad 124 relative to an armrest subframe 128, in accordance with one or more embodiments of the disclosure.

FIG. 5 is a flowchart illustrating a method for translating the arm pad 124 relative to an armrest subframe 128, in accordance with one or more embodiments of this disclosure. For example, the arm pad 124 may be locked in a home or retracted position, wherein the arm pad 124 is then unlocked, translated (e.g., slid) to an extended position, and relocked.

In one or more embodiments, the method 500 includes a step 510 of pressing an actuating end 156 of a lever 144 operatively coupled to at least one of the armrest subframe 128, a seat 100, or an arm 118 of the seat 100, wherein a pressing of the actuating end 156 of the lever 144 disengages a lock end 148 of the lever 144 from a first groove of a plurality of grooves 140 formed on one edge of the arm pad 124 via a fulcrum 146 operatively associated (e.g., rotationally coupled) with the lever 144. The first groove may be configured as any groove of the plurality of grooves 140.

In one or more embodiments, the method 500 includes a step 520 of translating the arm pad 124 relative to the armrest subframe 128. The translation may be induced manually (e.g., by pushing the arm pad 124) or by the motive force of the spring 160.

In one or more embodiments, the method includes a step 530 of releasing the actuating end 156 of the lever 144, wherein releasing the actuating end 156 of the lever 144 engages a lock end 148 of the lever with a second groove of the plurality of grooves 140, wherein the lock end 148 of the lever 144 is biased against the second groove via a spring 160 coupled to the lever 144 and a spring anchor 164 disposed on the arm pad. The second groove may be configured as any groove of the plurality of grooves 140. Once the lock end 148 is biased against the second groove of the plurality of grooves (e.g., via the locking pin 152), the arm pad 124 is locked into position.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An armrest comprising:
   an armrest subframe configured to couple to a seat or an arm of the seat comprising:
   a coupler configured to attach the armrest subframe to the seat or arm of the seat; and a slot within a face of the armrest subframe configured to receive a stop pin;

an arm pad operatively coupled to the armrest subframe and configured to slide alongside the armrest subframe, comprising:

a plurality of grooves formed on one edge of the armrest subframe;

the stop pin, wherein the stop pin restricts the translation of the arm pad along the armrest subframe; and a spring anchor; and a lever comprising:

a fulcrum rotationally coupled to at least one of the armrest subframe, the seat, or the arm of the seat;

a lock end comprising a locking pin configured to engage one or more grooves of the plurality of grooves; and an actuating end; wherein a movement of the actuating end at least one of engages or disengages the lock end from the one or grooves of the plurality of grooves; and a spring coupled to the spring anchor and the lever configured to bias the locking pin against the one or more grooves, wherein the spring is further configured to bias the arm pad to translate relative to the armrest subframe.

2. The armrest of claim 1, wherein the spring is configured as an extension spring.

3. The armrest of claim 1, wherein the coupler comprises at least one bolt.

4. The armrest of claim 1, wherein the arm pad comprises at least five grooves.

5. The armrest of claim 1, wherein the arm pad comprises at least 10 grooves.

6. The armrest of claim 1, wherein the seat is configured as a pilot seat for an aircraft.

7. A method to translate an arm pad relative to an armrest subframe comprising:

pressing an actuating end of a lever operatively coupled to at least one of the armrest subframe, a seat, or an arm of the seat, wherein a pressing of the actuating end of the lever disengages a lock end of the lever from a first groove of a plurality of grooves formed on one edge of the arm pad via a fulcrum operatively associated with the lever;

translating the arm pad relative to the armrest subframe; and releasing the actuating end of the lever, wherein releasing the actuating end of the lever engages a lock end of the lever with a second groove of the plurality of grooves, wherein the lock end of the lever is biased against the second groove via a spring coupled to the lever and a spring anchor disposed on the arm pad, wherein the spring is further configured to bias the arm pad to translate relative to the armrest subframe.

8. The method of claim 7, wherein the armrest subframe is coupled to the seat or the arm of the seat via a coupler.

9. The method of claim 8, wherein the coupler comprises at least one bolt.

10. The method of claim 7, wherein the spring is configured as an extension spring.

11. The method of claim 7, wherein the plurality of grooves comprises at least five grooves.

12. The method of claim 7, wherein the arm pad comprises at least 10 grooves.

13. The method of claim 7, wherein the seat is configured as a pilot seat for an aircraft.

* * * * *